United States Patent [19]
Feichter et al.

[11] 4,101,343
[45] Jul. 18, 1978

[54] THERMOCOUPLE DEVICE

[75] Inventors: Lowell H. Feichter, Pittsburgh; Albert R. Anderson, Export, both of Pa.

[73] Assignee: Aluminum Company of America, Pittsburgh, Pa.

[21] Appl. No.: 719,906

[22] Filed: Sep. 2, 1976

[51] Int. Cl.² .............................................. H01V 1/02
[52] U.S. Cl. .................................... 136/230; 136/221; 136/235; 73/352
[58] Field of Search ............... 136/221, 229, 230, 235; 73/351, 352, 359

[56] References Cited
U.S. PATENT DOCUMENTS

| | | | |
|---|---|---|---|
| 2,177,837 | 10/1939 | Miller | 136/221 |
| 2,978,527 | 4/1966 | Forde | 136/235 |
| 3,534,610 | 10/1976 | Pruden | 73/351 |

OTHER PUBLICATIONS

Griffiths, 1928, p. 64, Jour. Sci. Instruments, vol. 5.
"Spring Loaded Prod Type Thermocouple Assembly", 8/47, p. 730, Instruments, vol. 20.

*Primary Examiner*—Nelson Moskowitz
*Attorney, Agent, or Firm*—Elroy Strickland

[57] ABSTRACT

A thermocouple device comprising two low mass dissimilar metal elements each being of relatively short length and each having a relatively narrow cross section along their lengths. The elements are provided with pointed ends for engaging and penetrating the surface of an object to be measured for its temperature. The two metal elements are disposed together such that their pointed ends taper toward each other to form a single, unitary, pointed end. The two elements are separated by a relatively thin layer of heat resistant, insulating material, and extend into and are secured in an insulating refractory member.

3 Claims, 3 Drawing Figures

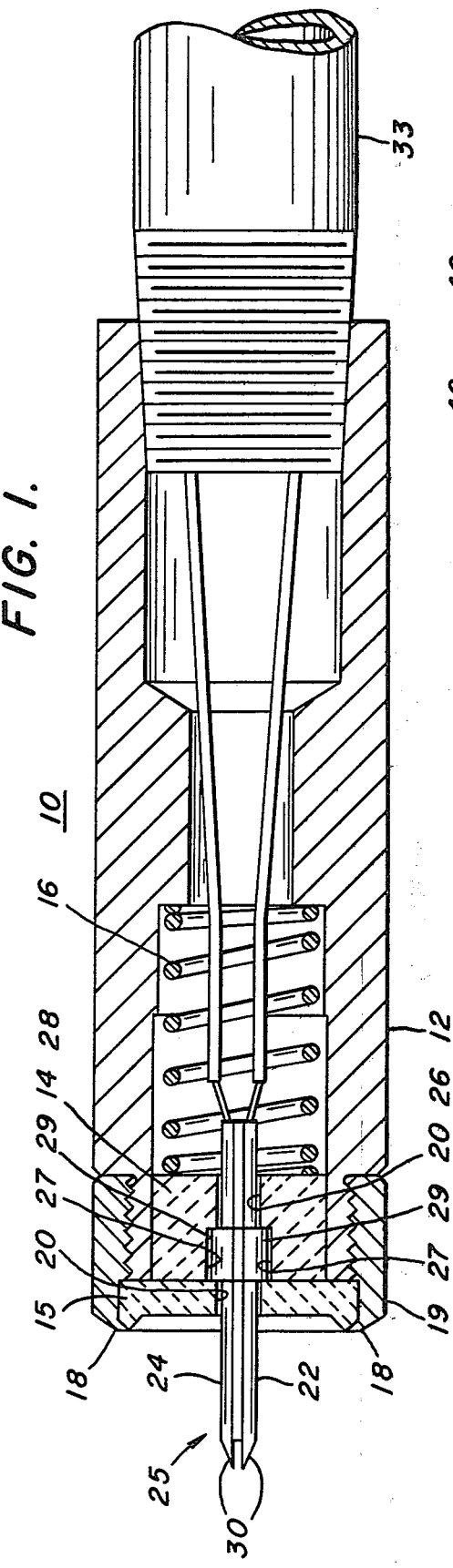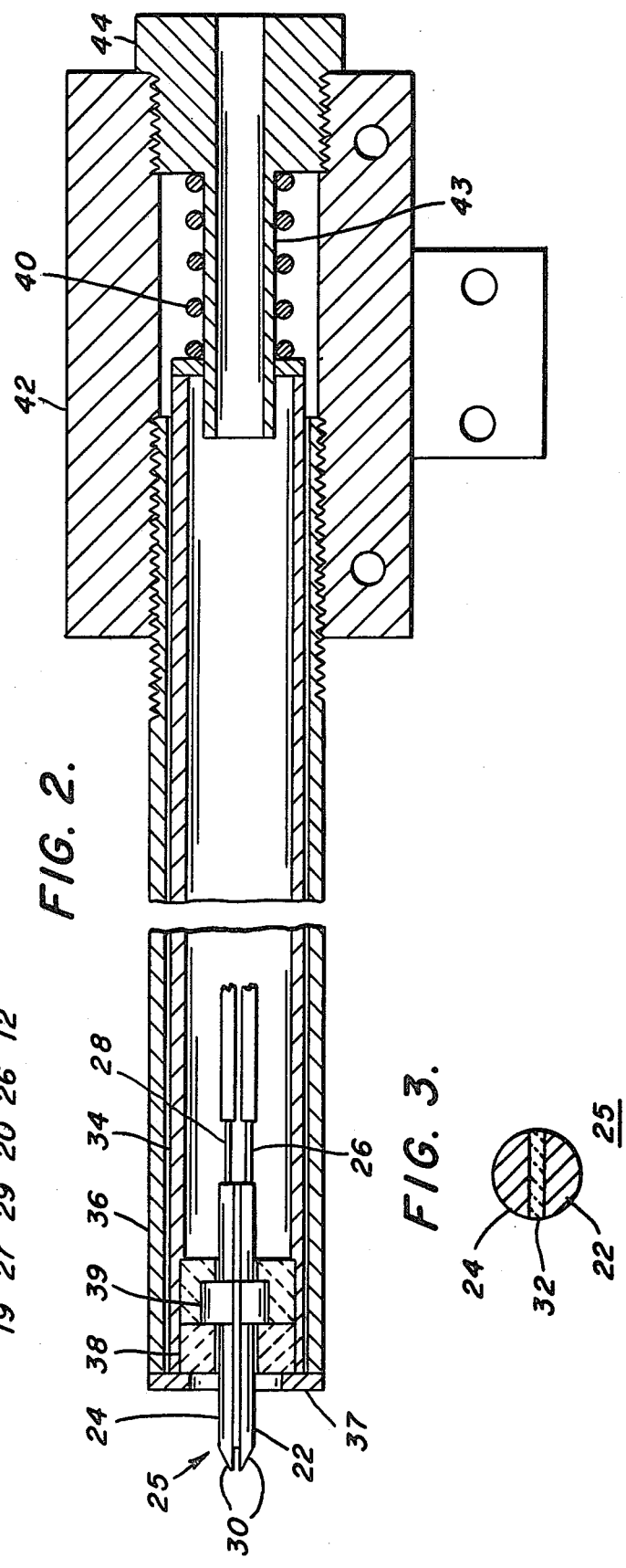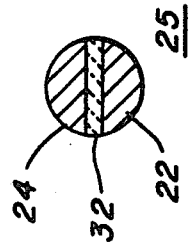

THERMOCOUPLE DEVICE

BACKGROUND OF THE INVENTION

The present invention relates generally to thermocouple devices, and particularly to a thermocouple device having pointed, thermocouple elements providing a unitary pointed end capable of repeated engagements with objects to be measured for their temperature.

In measuring the temperature of hot metal ingots, for example, thermocouple elements of temperature measuring devices are preferably pointed and disposed directly against the surfaces of the ingots with a force sufficient to penetrate any oxide layer on the ingots. It can be appreciated that repeated engagements of such ingots or other metal objects will tend to blunt and bend the pointed elements, with the result of unreliable, inaccurate temperature readings and/or frequent replacement of the elements, unless such elements are sufficiently rugged or protected by rugged, heat resistant structures. Yet, attempts to ruggedize and to increase the useful life of thermocouple elements have heretofore resulted in structures that tend to reduce the response time and accuracy of the thermocouples because of the increase in the mass and heat sinking effect of such structures.

For example, the response and accuracy of a thermocouple junction located in the pointed end of a ⅜ inch diameter, approximately 1/16 inch thick, steel probe is very poor, the increase in the temperature of the junction being slow and gradual after the steel probe is placed in contact with the object under test. The junction of this device required two and a half (2½) minutes to reach its final temperature reading; the object measured in this test was a 3/16 inch thick aluminum plate held at 600° F.

In an effort to extend the life of a two point thermocouple device, the pointed ends of the thermocouple elements of the device were coated with a layer of chrome, and the elements mounted approximately 1 inch apart in parallel relation in an insulating handle. In testing this device, using the above, 600° F, aluminum plate, the final temperature of the thermocouple elements was not reached until 1.5 minutes had elapsed. Even though response time and accuracy of this device indicated improvement over the steel tube probe, it was not sufficiently accurate for production processes, in which ingots, for example, are being continuously heated and directed to extrusion presses, the temperature of each ingot being preferably measured before it enters the press.

In addition, it has been found that with hand-held devices having two thermocouple elements spaced apart a distance of about an inch or so, it is difficult to obtain repeatable, accurate, temperature measurements unless the elements engage the object being measured in a direction substantially perpendicular to the object, i.e. two point thermocouple elements tend to be sensitive to the angle of application and the amount of the pressure at which the elements are applied. It can be appreciated that it is difficult, if not impossible, for a workman or workmen taking temperature readings to consistently apply such thermocouple elements at the proper angle and pressure.

Bare thermocouple elements made of flat, planar stock and fused together along opposed bevelled edges of the stock to form an elongated edge, such as shown in U.S. Pat. No. 2,978,527 to Forde, again present a substantial mass and heat sink to be heated by the object under test, so that response and accuracy of such devices are inadequate in terms of the objectives and advantages of the present disclosure. This was found to be true even with pointed elements made from round stock and fused together at their thermocouple ends. Several of such devices were made and tested, and found to have slow response times, which were probably due to the mass of the fused material.

BRIEF SUMMARY OF THE INVENTION

The present invention is directed to a thermocouple device having a fast response time yet is sufficiently rugged so that it provides consistent temperature readings over extended periods of repeated use. This is accomplished by using two closely spaced, relatively short thermocouple elements having a narrow cross section along their entire length, with each element being provided with a pointed end (as opposed to an elongated edge formed by opposed, planar, bevel surfaces) such that when the elements are placed together the pointed ends taper toward each other to form a single, unitary pointed end. The elements, however, are insulated from each other by a thin layer of heat resistant, insulating material. The closely spaced, narrow elements and insulating layer are firmly supported and held together by a ceramic member. This arrangement has been found to provide a rugged probe structure capable of repeatedly penetrating the oxide surface of a metal object to be examined for its temperature, with infrequent replacement of the thermocouple elements, yet the probe has a minimum heat sink effect when measuring temperature which provides a rapid response, accurate measurement.

THE DRAWING

The objectives and advantages of the invention will best be understood from consideration of the following detailed description and the accompanying drawing in which:

FIG. 1 is a longitudinal section of one embodiment of the thermocouple device of the invention;

FIG. 2 is a longitudinal section of a second embodiment of the invention; and

FIG. 3 is a cross sectional view of the thermocouple elements employed in the devices of FIGS. 1 and 2.

Referring now to the drawing, FIG. 1 thereof shows in longitudinal section a thermocouple device designated generally by numeral 10. The device comprises a hollow shell or housing 12, the material of which may be of metal, such as aluminum or stainless steel, though non-metallic, heat resistant materials may be used. Within the forward end of the housing is located two, longitudinally aligned, annular ceramic members 14 and 15 held against the force of a coil spring 16 by the inwardly facing flange 18 of a threaded nipple 19 threaded on the end of the housing. The material of members 14 and 15 may be a machinable ceramic, such as made by Corning Glass Works of Corning, New York. The members 14 and 15 are provided with aligned center bores 20 to receive and firmly secure two closely spaced, thermocouple elements 22 and 24 which form a short, unitary, probe-like structure 25. The thermocouple elements are held in housing 12 and in ceramic member 14 by raised or shoulder portions 26 provided on the shank of the elements, and a corresponding, annular recess 27 provided in member 14, concentric with bore 20, and sized to receive the raised portions of the elements. As shown in FIG. 1, recess 27 may extend to the face of member 14 so that the forward ends or faces of raised portions 26 abut against the rear face of member 15. Since member 14 provides recess 27 for raised portions 26, 14 is shown longer than member 15, 15 having the wafer-like configuration depicted in FIG. 1.

The material of thermocouple elements 22 and 24 may be respectively Alumel or Chromel, though other thermocouple materials may be used. Leads 29 are connected, such as by silver soldering, to the ends of the thermocouple elements located within the housing for connection to appropriate means (not shown) adapted to indicate the temperature measured by elements 22 and 24.

As seen in the figures, the thermocouple elements 22 and 24 are relatively short and narrow (in cross section) structures that provide a minimum mass for the elements, and thus a minimum time for the elements to attain the temperature of the item being measured. Elements 22 and 24 may be made from ¼ or ⅜ inch round diameter stock, for example, longitudinally cut in half, as indicated in FIG. 3, so that each element has a flat side. The composite thermocouple probe 25 then has a diameter that is substantially that of the diameter of the original stock when 22 and 24 are placed together along the flat sides of the elements. The raised portions 26 can be provided, for example, by simply reducing (machining) the outer diameter of the original stock on each side of the location therealong chosen for 26. With the use of ¼ inch stock, 26 would remain ¼ of an inch while the remainder is reduced to 5/32 of an inch, for example. The length of such elements need only be sufficient to effect their securance in the ceramic members 14 and 15. In one embodiment of the device 10, a suitable length for elements 22 and 24 was ½ inches.

The ends of the elements 22 and 24 located outside of the housing 12 are pointed (at 30) in the directions of their flat sides so that the pointed ends form a single, unitary point when the flat sides of the elements are placed together. The elements 22 and 24, however, are separated by a thin layer of heat resistant, insulating material 32, as shown in the figures, the insulating material beginning at a location removed from the pointed ends (about one quarter of an inch, for example) and extending to the rear of elements 22 and 24. Mica, having a thickness on the order of 0.035 of an inch, has been found to be suitable for layer 32, though other materials and thicknesses (0.015 to 0.050 of an inch) may be used.

A hollow handle and/or conduit 33 may be threaded into the rearward end of housing 12, as shown in FIG. 1.

In using thermocouple device 10, the pointed ends 30 of elements 22 and 24 are disposed against a metal object (not shown) to effect electrical contact between the metal of the object and elements 22 and 24. Electrical current flows between the elements and through the object when the elements are electrically connected to a cold junction (not shown). The amount of current flow, or electromotive force (emf), which occurs in a millivolt range, is the measure of the temperature of the object. If the elements are disposed and held against the object by hand, i.e., by the hand of a workman, spring 16 functions to provide a controlled, constant amount of force at which the elements engage the hot item, as the workman or workmen will tend to apply the thermocouple device with differing amounts of force each time the device 10 is employed to measure temperature.

The thermocouple device of the invention, having a ¼ inch diameter, Alumel and Chromel tip and Mica insulation 32, was tested by being cycled into and out of engagement with a billet (heated to 800° F) over 10,000 times without replacement of the tip, i.e., without replacement of thermocouple elements 22 and 24. This compares very favorably with a thermocouple device presently being used in the industry, which device has two, pointed, parallel elements that are spaced apart about ½ inches. These elements require replacement on an average of every 500 cycles of application.

In another test, the single point device of the invention has a response time three to four times faster than the above, two point thermocouple device, and was found not to be as sensitive to the angle of application and the amount of pressure as the two point device. In this test, the single point thermocouple 25 was tested by being cycled into and out of physical contact with a billet heated to a temperature of approximately 800° F.

FIG. 2 shows an embodiment of the invention in which the basic heat sensing elements 22 and 24 are substantially the same as those shown in FIG. 1 and described above. The housing of FIG. 2, however, is different in that it includes two elongated, concentric, inner and outer tubular members 34 and 36. The forward end of the inner member is shown containing two, aligned, ceramic members 38 and 39 which, in turn, secure thermocouple elements 22 and 24 together in the manner of FIG. 1. The forward end of outer tube 36 is provided with an inwardly extending, annular flange 37. The rearward end of inner tube 34 bears against a coil spring 40 located within a housing structure 42 and around a tubular extension 43 of a hollow insert 44 that closes the rearward end of housing 44. Spring 40, in turn, forces inner tube member 34 and ceramic member 38 against flange 37 of the outer tube, and forces members 38 and 39 together. The outer tube 36 is suitably secured in the forward end of housing 42.

The outer diameter of the inner member 34 is slightly less than the inner diameter of the outer member 36 so that these members are relatively longitudinally movable against the force of spring 40. In repeated applications of the device of FIG. 2, against a heated object, spring 40 serves the same function as spring 16 in the embodiment of FIG. 1.

The thermocouple device of FIG. 2 is particularly suitable for high temperature and open flame areas since it is an elongated structure that permits grasp or mounting of the structure at an end remote from the forward, temperature measuring end. For use in such environments, the members 34 and 36 are preferably stainless steel or some other heat resistant material.

The operation and advantages of the device of FIG. 2 are the same as those described above in connection with the embodiment of FIG. 1, the thermocouple elements and probe 25 of the device being relatively short, pointed, low mass structures that are capable of repeatedly penetrating the surface of the item or object to be measured for its temperature, and are capable of heating rapidly to the temperature of the item when they contact the item.

While the invention has been described in terms of preferred embodiments, the claims appended hereto are intended to encompass all embodiments which fall within the spirit of the invention.

What is claimed is:

1. A two-element thermocouple device having a unitary pointed end for contacting and penetrating the surface of a metal object to be examined for its temperature, the device comprising two, closely spaced, relatively short, dissimilar metal elements each having a narrow cross section and low mass along the length thereof, and pointed at at least one end, the two metal elements being disposed together in a manner that their pointed ends taper toward each other to form a unitary pointed end, a relatively thin layer of heat resistant, insulating material located between the metal elements to insulate the elements from each other, a housing, and an insulating refractory member located within said housing, with a portion of said metal elements and insulating layer extending into and secured in said refractory member.

2. The structure of claim 1 including a spring located within said housing, said spring being adapted to control the force at which the metal elements contact the surface of the object to be examined for its temperature.

3. The structure of claim 2 in which the housing comprises two elongated tubular structures, with one of said structures being located within the other structure, and being movable relative to each other against the force of the spring.

* * * * *

UNITED STATES PATENT AND TRADEMARK OFFICE
CERTIFICATE OF CORRECTION

PATENT NO. : 4,101,343
DATED : July 18, 1978
INVENTOR(S) : Lowell H. Feichter et al It is certified that error appears in the above-identified patent and that said Letters Patent are hereby corrected as shown below:

| | |
|---|---|
| Abstract page, under "References Cited" | After "2,978,527" change "4/1966" to --4/1961--; and after "3,534,610" change "10/1976" to --10/1970--. |
| Col. 3, line 22 | Change "5/8" to --1/8--. |
| Col. 3, line 38 | After "was" add --one and a half--; and change "1/2" to --(1-1/2)--. |
| Col. 4, line 12 | After "about" add --one and one half--; and change "1/2" to --(1-1/2)--. |
| Col. 4, line 15 | Change "has" to --had--. |

Signed and Sealed this

Sixth Day of February 1979

[SEAL]

Attest:

RUTH C. MASON
Attesting Officer

DONALD W. BANNER
Commissioner of Patents and Trademarks